United States Patent [19]

Skeppström

[11] Patent Number: 5,195,387
[45] Date of Patent: Mar. 23, 1993

[54] GEAR SELECTOR DEVICE FOR A VEHICLE GEARBOX

[75] Inventor: Tomas Skeppström, Södertälje, Sweden

[73] Assignee: Saab-Scania Aktiebolag, Sweden

[21] Appl. No.: 743,330

[22] PCT Filed: Dec. 20, 1990

[86] PCT No.: PCT/SE90/00856
§ 371 Date: Aug. 20, 1991
§ 102(e) Date: Aug. 20, 1991

[87] PCT Pub. No.: WO91/10084
PCT Pub. Date: Jul. 11, 1991

[30] Foreign Application Priority Data

Dec. 27, 1989 [SE] Sweden ............... 8904372

[51] Int. Cl.⁵ .................. B60K 20/00; G05G 5/06
[52] U.S. Cl. .................. 74/475; 74/473 P; 74/527
[58] Field of Search ............ 74/473 P, 475, 527

[56] References Cited

U.S. PATENT DOCUMENTS

| | | | |
|---|---|---|---|
| 2,917,941 | 12/1959 | Wittren | 74/475 X |
| 4,338,828 | 7/1982 | Ruhlman | 74/475 |
| 4,365,522 | 12/1982 | Kubota et al. | 74/475 |
| 4,646,582 | 3/1987 | Kijima | 74/475 X |
| 4,704,916 | 11/1987 | Wilhelmy | 74/475 |
| 4,912,997 | 4/1990 | Malcolm et al. | 74/475 X |

FOREIGN PATENT DOCUMENTS

| | | |
|---|---|---|
| 0246353 | 11/1987 | European Pat. Off. . |
| 1333227 | 6/1963 | France ............... 74/473 P |
| 2112881 | 7/1983 | United Kingdom . |

Primary Examiner—Leslie A. Braun
Assistant Examiner—David W. Laub
Attorney, Agent, or Firm—Ostrolenk, Faber, Gerb & Soffen

[57] ABSTRACT

A gear selector device (1) for an indirectly maneuvered vehicle gearbox has a pivotably mounted maneuvering column (3) and a locking arrangement (17) for locking the column in predetermined positions. The locking arrangement includes a first locking part (18) arranged on the maneuvering column and a second locking part (19) which cooperates with the first part and forms a cover for the housing (4) of the gear selector device and has a guide slot (21) for the maneuvering column. A spring-loaded first locking body (31) on the maneuvering column (3) can be brought into engagement with different locking members (30) in the cover and thereby hold the maneuvering column in different positions.

16 Claims, 4 Drawing Sheets

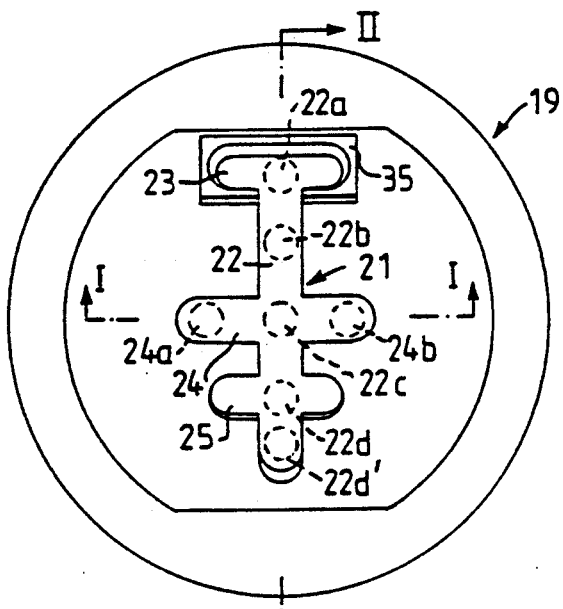
FIG.3
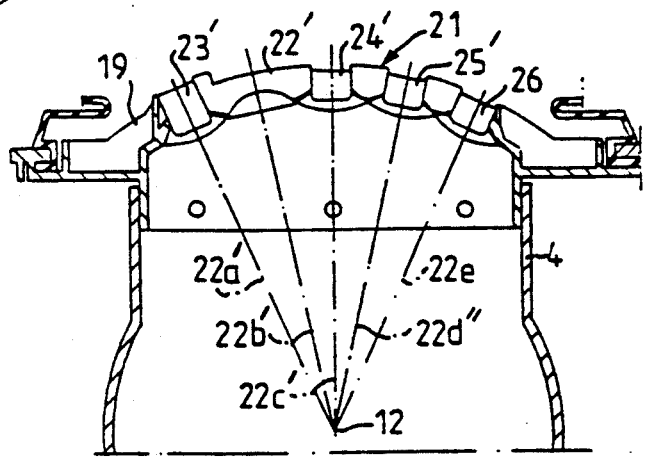
- - R - +
   |
   N
   |
HOLD - AUTO - EBR
   |
- - REC - +
SHIFT
FIG.4
FIG.5
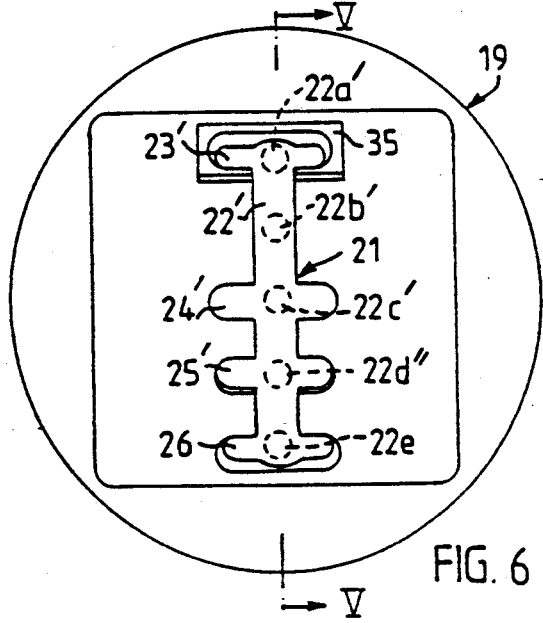
FIG. 6
- - R - +
   |
   N
   |
- - 1 - +
   |
- - 2 - +
   |
- - 3 - +
FIG.7

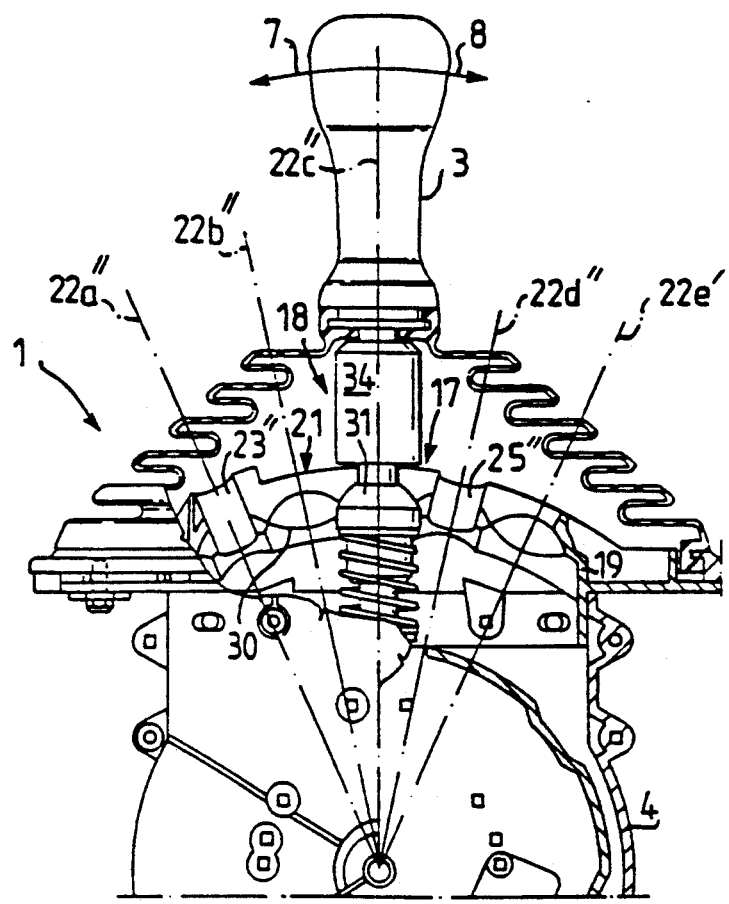
FIG. 8
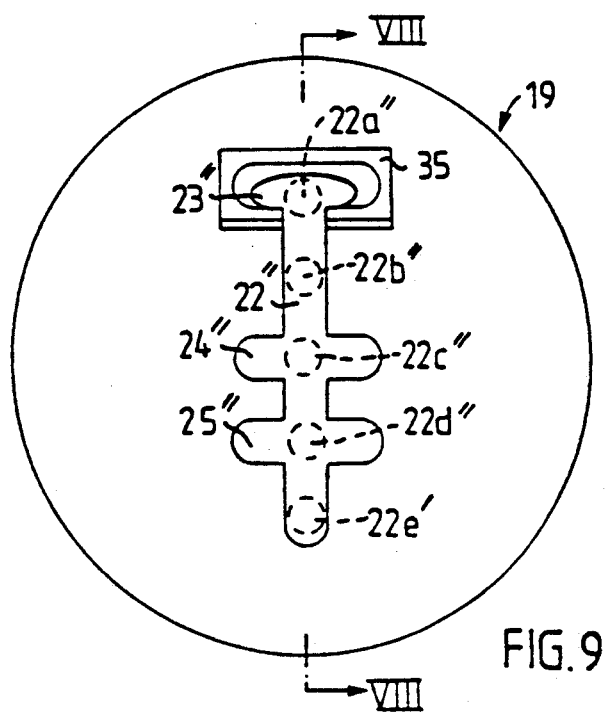
FIG. 9
- - R - +
- - N -
- - A - +
- - M - +
- - N -
FIG. 10

5,195,387

GEAR SELECTOR DEVICE FOR A VEHICLE GEARBOX

BACKGROUND OF THE INVENTION

1. Field of the Invention

The present invention relates to a gear selector device for a gearbox intended for motor vehicles and of the type which is maneuvered indirectly via a control unit connected to the gear selector device, provided with a pivotably mounted maneuvering column, and with a locking arrangement for locking the maneuvering column in predetermined positions.

In automotive technology it is becoming more and more common, especially in the case of heavy vehicles such as, for example, lorries and buses, to attempt to make the driver's work easier by reducing and simplifying the effort required for changing gear. This is achieved by means of indirect maneuvering of the gearbox, whereby the driver maneuvering a gear selector device so as to cause the latter to emit, as a function of the position, different signals intended to carry out via the servo the actual maneuvering of the gearbox, i.e. to effect engagement and disengagement of gears.

By having a control unit detect the actual driving conditions, such as, for example, speed, acceleration, engaged gear and engine speed, it is possible to further facilitate the work of the driver. The control unit can then calculate which gear should be engaged and can present its suggestion to the driver on a gear indicator. Then, with the aid of the gear selector device, the driver can change gear according to the suggestion or deviate from the suggestion. The gear selector device may also permit a choice between, for example, different semiautomatic or fully automatic predetermined gear programs.

2. Description of the Prior Art

In order to permit simple adjustment of the gear selector device to desired positions, it is known to use a single maneuvering column and to mount the latter pivotably in different planes, for example in a plane parallel to the longitudinal direction of the vehicle and in planes transverse to this plane.

In one embodiment according to U.S. Pat. No. 4,519,266, of the locking arrangement which holds the maneuvering column in different positions is located in connection with the pivot center of the maneuvering column and permits a gear-changing pattern of the type which is customary in manual gearboxes. There are no non-locking positions.

In another design, according to SE-A-8803674-4, the maneuvering column can be adjusted to different positions in a first plane and can be pivoted non-lockingly from these positions transverse to this plane. The locking arrangement which holds the maneuvering column in different longitudinal positions, is in this case designed with a cam curve in the bottom of the housing of the gear selector device, but there is however no possibility of locking the maneuvering column in the lateral direction. Among the disadvantages associated with these known embodiments is the fact that, when a modified gear-changing pattern is required, it is necessary to alter the housing of the gear selector device internally in order to obtain new positions for the maneuvering column. In addition, the locking arrangement competes for space with the sensors which are required for detecting the different positions of the maneuvering column.

SUMMARY OF THE INVENTION

The aim of the invention is to provide a gear selector device which is of simple construction and can be easily modified in order to satisfy different requirements with respect to gear-changing patterns, but which is nevertheless easy and convenient for the driver to operate.

According to the invention, this aim is achieved by virtue of the fact that the locking arrangement includes a first locking part arranged on the maneuvering column, and a second locking part which cooperates with the first locking part and is connected to the housing in which the maneuvering column is mounted, and which has a guide slot which is intended for the maneuvering column and in which there are locking members which define the predetermined positions for the column in the guide slot. In this case the second locking part advantageously forms a cover for the housing and is detachably mounted on the latter.

According to a particularly advantageous embodiment, the locking members consist of recesses which are arranged in the second locking part and which cooperate with a first locking body, spring-loaded in the direction of the recesses, in the first locking part, and the first locking body is displaceable along the maneuvering column and has a suitable form for centering in the recesses.

With a gear selector device according to the invention, great adaptability to different requirements is obtained, since one and the same housing for the gear selector device can be combined with differently shaped covers, incorporated in the second locking part. This results in a simple adaptation to different types of gearboxes and permits a large number of different gear-changing patterns.

The invention is described in greater detail below on the basis of exemplary embodiments shown in the drawings. Like numerals have been used to illustrate the same parts.

BRIEF DESCRIPTION OF THE DRAWINGS

FIG. 3 is a top view of the guide groove of the embodiment according to FIGS. 1 and 2, FIG. 4 indicates the different gear positions which can be obtained in FIG. 3, FIG. 5 is a cross-sectional view of a gear selector device of a second embodiment FIG. 6 is a top view of the guide groove according to FIG. 5, FIG. 7 illustrates the different gear positions in accordance with FIG. 6, FIG. 8 is a cross-sectional view of a gear selector device of a third embodiment of the present invention FIG. 9 is a top view of the guide groove according to FIG. 8, FIG. 10 illustrates the different gear positions in accordance with FIG. 9

DESCRIPTION OF THE PREFERRED EMBODIMENTS

Figure 1:
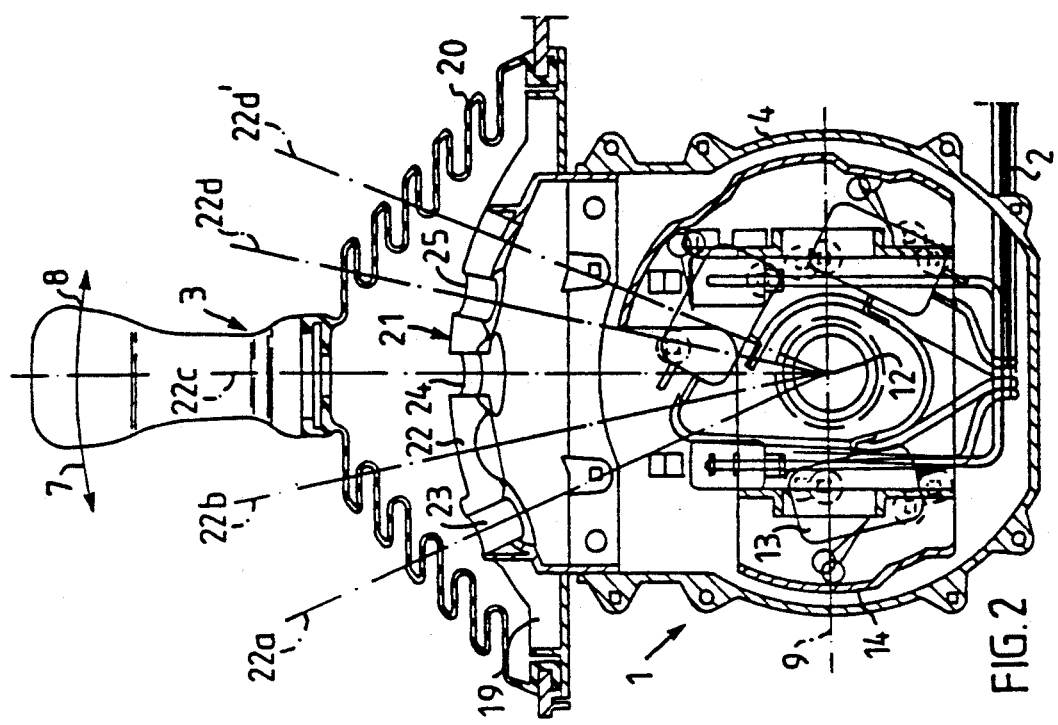
FIG. 1 shows a diagrammatic end view, partially in cross-section, of a gear selector device according to the invention.

A gear selector device 1 according to the invention is designed to be connected in known manner via lines 2 to a control unit (not shown) which is intended for a motor vehicle gearbox and which, via the servo on the gearbox, effects engagement and disengagement of gears as a function of the position of a maneuvering column 3 in the gear selector device 1, which is maneuvering by the driver. Since the invention relates solely to the gear selector device, only the latter is shown.

The control unit can be provided in a known manner, by means of different sensors, with information relating to the actual driving conditions and can, on the basis of this, calculate which gear should be used. The driver can in this way obtain information, for example via a gear indicator, on which gear is being used at a given time and on which gear the control unit recommends. This gives the driver the possibility of choosing, as and when required, the gear or gear-changing pattern. He can choose, for example, between automatic and manual transmission in different forms.

The maneuvering column 3 is mounted in a housing 4 which is intended to be fixed securely in the vehicle, and the column is mounted in a cradle 5 which is borne pivotably in the housing 4. In this way, the maneuvering column 3 together with the cradle 5 can be pivoted about a horizontal axis line 6 (FIG. 1) in the direction of arrows 7 or 8 (FIG. 2). In the cradle 5, the maneuvering column 3 is mounted pivotably about a horizontal axis line 9, in the direction of arrows 10 or 11. The axis line 9 is at right angles to the axis line 6 and intersects the latter at a pivoting center 12 and is preferably oriented in the longitudinal direction of the vehicle. However, it is also possible for the axis lines 6 and 9 to be situated at different levels and, therefore, for the bearing of the maneuvering column to be designed differently.

The maneuvering column 3 cooperates with a number of different sensors 13 for indicating different positions of the maneuvering column. These sensors can be designed in a number of different ways and can consist for example, as shown, of circuit breakers which cooperate with suitably designed cam curves 14. For indicating the pivoting in the direction of arrows 7 or 8, for example, the circuit breakers can be mounted in the cradle 5 while the cam curves 14 are secured in the housing 4, or vice versa. For indicating the pivoting in the direction of arrows 10 or 11, the cradle 5 can support one or more sensors 15, for example circuit breakers, which cooperate with cam curves 16 on the maneuvering column 3, or vice versa. It is also well known to use, for example, contactless sensors or other types of sensors. These sensors are connected via the lines 2 to the control unit (not shown).

Arranged between the free end of the maneuvering column and the pivoting center 12 is a locking arrangement 17 by means of which the maneuvering column 3 can be locked in predetermined positions, depending on which movement pattern has been chosen for the manoeuvring column. Locking arrangement 17 includes a first locking part 18 arranged on the column 3, and a second locking part 19 which is incorporated in the gear selector device housing 4 and is designed to cooperate with the first locking part 18. The second locking part 19 can advantageously form a cover for the housing 4 and is expediently protected by a gaiter 20 which is attached to the maneuvering column 3 and to the housing 4. In the second locking part 19 there is a guide slot 21 intended for column 3 and defining the movement pattern of the column. This guide slot 21 is normally made up of a longer slot 22, which permits movement of the column in the direction of arrows 7 and 8, and of a number of transverse, shorter slots 23-25, which permit movement in the direction of arrows 10 and 11.

Figure 2:
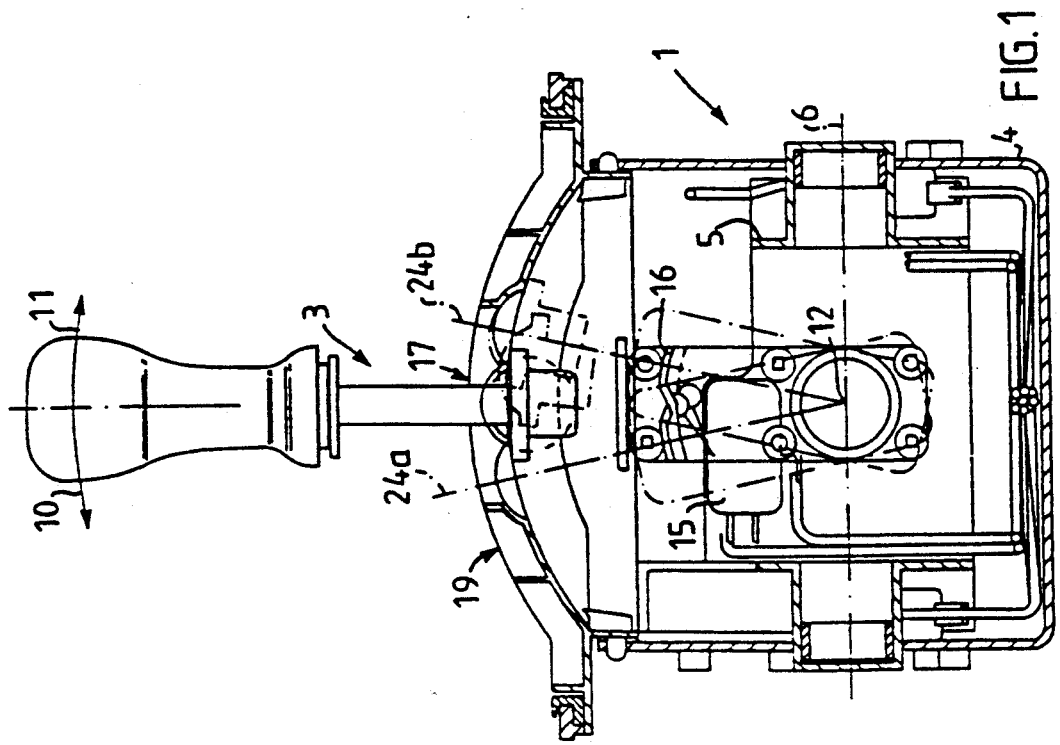
FIG. 2 shows a diagrammatic side view, partially in cross-section, of the gear selector device in FIG. 1.

In the embodiment according to FIGS. 1-3, the maneuvering column 3 can be pivoted between four fixed positions in the slot 22, namely a first position 22a at the level of the slot 23, a second position 22b between the slots 23 and 24, a third position 22c at the level of the slot 24, and a fourth position 22d at the level of the slot 25. In addition, it is possible to pivot the manoeuring column 3 from the fourth position 22d in the direction of arrow 8 to a non-locking position 22d' where the maneuvering column remains only for as long as it is held there.

From the position 22c at the level of the slot 24, the manoeuvring column can be pivoted either in the direction of arrow 10 to a fixed position 24a, or in the direction of arrow 11 to a fixed position 24b. From both position 22a in slot 23 and position 22d in slot 25, the column 3 can be moved in the direction of arrow 10 or 11 to non-locking side positions at the respective slot ends.

The meaning of the different positions of the maneuvering column 3 in FIGS. 1-3 emerges more clearly from FIG. 4, which shows diagrammatically the movement pattern according to FIG. 3. Position R corresponds to position 22a and represents a reverse position. By means of a sideways movement in the slot 23, a higher or lower reverse gear can be obtained, + and − indicating a change to a higher or lower gear, respectively, than that chosen by the automatic mechanism. The position N corresponds to position 22b and represents the neutral position. The position AUTO corresponds to position 22c and represents automatic transmission. In position HOLD, corresponding to 24a, the engaged gear is held, while in position EBR, (engine braking) corresponding to 24b, the engine brake is coupled. In position REC, (recommended) corresponding to 22d, the system recommends a specific gear, + and − indicating a change of the recommended gear to a higher or lower gear, respectively. In the position SHIFT, corresponding to 22d', disengagement is carried out and the gear is changed on the basis of selection in the REC position. This embodiment according to FIGS. 1-4 represents a fully automatic version in which the control device in the "automatic positions" chooses the gear and carries out gear-changing automatically.

FIGS. 5-7 show a semiautomatic embodiment in which the control device selects the gear, but where the driver maneuvers the clutch and thereby triggers the gear change. In the guide slot 21 there is, in the previous embodiment, a longer slot 22, but the number of transverse slots 23'-26 is now four instead of three. There are five fixed positions in the slot 22', namely 22a'-e. Only non-locking positions can be obtained in one direction in the transverse slots 23'-26.

As emerges more clearly from FIGS. 6 and 7, the positions 22a-e correspond to R, N, 1, 2 and 3, respectively, where R and N represent, as previously, the reverse position and neutral position, respectively. The positions 1, 2 and 3 represent different gear range positions. As set forth previously, + and − indicate a change of the recommended gear to a higher or lower gear, respectively.

FIGS. 8-10 also show a semiautomatic embodiment, similar to that in FIGS. 5-7. The transverse slots are here reduced to three, namely 23″-25″. There are still five fixed positions in the slot 22″, namely 22″-e′. From the slot 22, only non-locking positions can be obtained in one direction in the slots 23″-25″.

According to FIGS. 9 and 10, the positions 22a″-e′ here correspond to R, N, A, M and N, respectively, where R and N still represent the reverse position and neutral position, respectively. The positions A and M, corresponding to 22c′ and 22d″, represent the automatic position and manual position, respectively. The position N corresponding to 22e′ represents an extra neutral position intended to be used in particular circumstances, for example in emergency situations, when decoupling of the whole gear selector device is desired. The symbols + and − have the same meanings as before.

Figure 11:
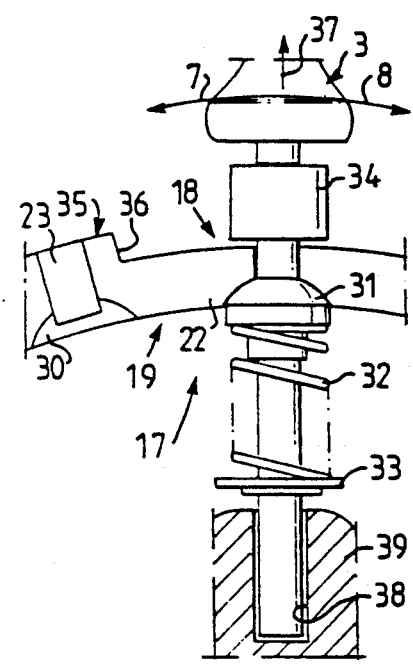
FIG. 11 shows a detail of the maneuvering column.
Figure 12:
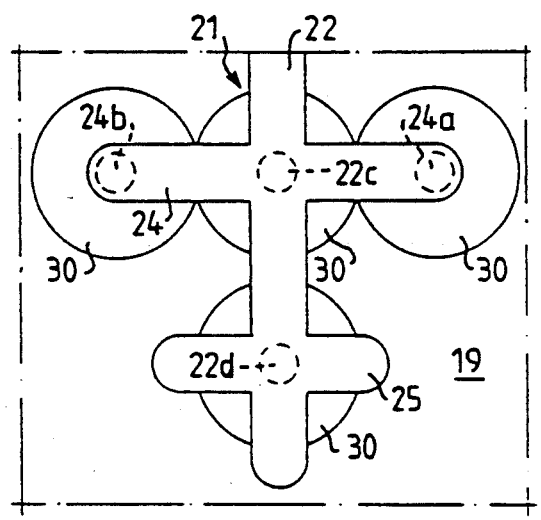
FIG. 12 shows a bottom view, of a cross-section of the second locking part in the embodiment according to FIGS. 1-3.

The design of the locking arrangement 17 emerges more clearly from FIGS. 8, 11 and 12, where FIG. 11 shows in principle the same feature as in FIG. 8, but in simplified form. As has already been mentioned, the locking arrangement 17 is divided up into a first locking part 18 arranged on the maneuvering column 3 and a second locking part 19 cooperating with the first locking part and joined to the housing 4.

In the guide slot 21 there are arranged on the underside of the second locking part 19 a number of locking members 30, here in the form of rounded recesses. These locking members 30 can cooperate one at a time with a first locking body 31 incorporated in the first locking part 18 and mounted displaceably on the maneuvering column 3. With the aid of a spring 32, which bears against an attachment 33 arranged securely on the manoeuvring column 3, the first locking body 31 is loaded in the direction of the free end of the manoeuvring column. By means of cooperation with suitable locking members 30, the first locking body 31 can in this way fix the maneuvering column in the desired position. The rounded shape means that the first locking body 31 can be pivoted, counter to a certain force from the spring 32, between different fixed positions, i.e. it can be brought into engagement with different locking members. At the same time spring back to a centered position is possible by pivoting the maneuvering column slightly past a centering locking member. From, for example, the centered position 22d in FIG. 12, the column, when pivoted in either one direction in slot 25 or downwards in slot 22, can be made to spring back to the centered position 22d.

The maneuvering column 3 also supports a second locking body 34 incorporated in the first locking part 18 and situated so that the first and the second locking body 31 and 34, respectively, are located on each side of the second locking part 19. This second locking body 34 is secured on the column 3 and is situated near or can slide along the second locking part 19 and its task is to cooperate with at least one locking device 35 on the second locking part 19 so as to prevent the column 3 from being pivoted inadvertently to a particular setting. The locking device 35 can consist, for example, of a raised section around the transverse slot 23 of the reverse position R. A stop surface 36 on the locking device 35 is intended to catch the second locking body 34. If required, however, the second locking body 34 can be made to pass the locking device 35 in order to be able to engage the reverse position, for example. This is possible by virtue of the fact that the maneuvering column 3 is mounted axially movable and can be lifted in the direction of arrow 37, counter to the force from the spring 32, at the same time as it is pivoted in the direction of arrow 7. Upon pivoting back in the direction of arrow 8, the column returns to its axially inner position under the effect of the spring 32. The second locking body 34 can in this respect limit the return in the axial direction, but it is also possible, for example, to let the column touch the bottom of a moderately deep hole 38 in a bracket 39 for the column.

Instead of arranging the locking members 30, as shown here, on the inside of the second locking part 19 facing away from the free end of the column, the locking members 30 can be arranged on the outside of the second locking part 19, with correspondingly different positioning of the first and the second locking bodies 31 and 34, respectively. In this case it is necessary to displace the column in the opposite direction to that previously stated in order to be able to pass the locking device 35.

The recesses 30 and the first locking body 31 have been shown here with a rounded shape, but it is also possible to use other shapes which permit good locking in fixed positions and yet allow movement between fixed positions and permit spring back in certain positions.

I claim:

1. A gear selector device for a gear box for motor vehicles, comprising:
 a stationary housing having an open top;
 a maneuvering column extending through the open top of the housing, a pivot center for the column located in the housing at which the maneuvering column is pivotable around at least one axis, and the maneuvering column having a plurality of predetermined pivot positions around the axis, corresponding to particular gear shift positions;
 a locking arrangement for selectively locking the maneuvering column in selected ones of the plurality of positions and enabling unlocking of the maneuvering column from the selected positions, the locking arrangement comprising:
 a first locking part on the maneuvering column and movable as the maneuvering column is pivoted;
 a second locking part connected on the housing and forming a cover for the open top of the housing and with respect to which the first locking part is movable and with which the first locking part engages, the second locking part having a guide slot extending along it in the directions in which the maneuvering column may pivot around the at least one axis, the column extending through the guide slot;
 locking members in the guide slot, each locking member positioned for being engaged by the first locking part such that engagement of the first locking part with a respective locking member in the guide slot determines a respective predetermined pivot position for the maneuvering column in the guide slot.

2. The gear selector device of claim 1, wherein the pivot center for the maneuvering column is adapted for enabling the maneuvering column to pivot around at least two different axes.

3. The gear selector device of claim 2, wherein the guide slot extends in a longitudinal direction along the second locking part and the guide slot further comprises at least one transverse slot, transverse to the longitudinal guide slot, which enables the maneuvering column to pivot to move along the longitudinal guide slot and to pivot to move along each of the transverse slots, both the longitudinal guide slot and the transverse slot defining some of the predetermined pivot positions for the maneuvering column.

4. The gear selector device of claim 1, wherein the second locking part which forms the cover is detachably mounted on the housing.

5. The gear selector device of claim 1, wherein the locking members in the second locking part comprise spaced apart recesses in the second locking part; and the first locking part comprises a first locking body shaped for being received in each of the recesses for selecting the predetermined pivot positions for the maneuvering column.

6. The gear selector device of claim 5, further comprising a spring connected with the first locking part for spring loading the locking body into each of the recesses.

7. The gear selector device of claim 6, wherein the locking body is displaceable along the maneuvering column and is spring urged toward the recesses in the second locking part, and the locking body has a form for being centered in each of the recesses.

8. The gear selector device of claim 6, wherein the maneuvering column has a free end out of the housing, and the recesses on the second locking part are arranged on the side of the second locking part that faces away from the free end of the maneuvering column, and the first locking body is spring biased into the recesses.

9. The gear selector device of claim 8, wherein the first locking part further comprises a second locking body, the first locking body being at one side of the second locking part and the second locking body being on the opposite side of the second locking part.

10. The gear selector device of claim 5, wherein the first locking part further comprises a second locking body, the first locking body being at one side of the second part and the second locking body being on the opposite side of the second locking part;

a locking device on the second locking part and positioned to be engaged by the second locking body for blocking pivoting of the maneuvering column to at least one of its predetermined pivot positions, and the second locking part being so shaped that the maneuvering column may be moved to the at least one predetermined pivot position by movement of the maneuvering column in another direction in addition to the direction of pivoting of the maneuvering column to the one predetermined pivot position.

11. The gear selector device of claim 10, wherein the locking device comprises a raised portion formed on the second locking part at the one predetermined pivot position, and the additional direction of motion of the maneuvering column comprises the maneuvering column and the second locking body being axially displaceable to a location enabling the second locking body to pass the locking device upon pivoting of the maneuvering column to the predetermined pivot position.

12. The gear selector device of claim 5, wherein the guide slot comprises a longitudinal slot extending in a longitudinal direction along the second locking part and the guide slot further comprises at least one transverse slot, transverse to the longitudinal slot, which enables the maneuvering column to pivot to move along the longitudinal slot and to pivot to move along each of the transverse slots, both the longitudinal slot and the transverse slot defining some of the predetermined pivot positions for the maneuvering column.

13. The gear selector device of claim 12, wherein there are a plurality of the transverse slots which intersect the longitudinal slot at various locations along the longitudinal slot, with each transverse slot defining at least one of the predetermined pivot positions of the maneuvering column in the guide slot.

14. The gear selector device of claim 13, wherein there are a number of the predetermined pivot positions of the maneuvering column along at least the longitudinal slot.

15. The gear selector device of claim 14, wherein in at least one of the predetermined pivot positions of the maneuvering column, the maneuvering column is pivotable away from a fixed position to a non-locking position in at least one direction.

16. The gear selector device of claim 9, further comprising a locking device disposed on the second locking part and positioned to be engaged by the second locking body for blocking the pivoting of the maneuvering column to at least one of its predetermined pivot positions, and the second locking part being so shaped that the maneuvering column may be moved to the at least one predetermined pivot position by movement of the maneuvering column in another direction in addition to the direction of pivoting of the maneuvering column to the one predetermined pivot position.

* * * * *